(12) United States Patent
Inaba

(10) Patent No.: US 6,296,360 B1
(45) Date of Patent: Oct. 2, 2001

(54) STEREO SLIDE MOUNT, STEREO SLIDE VIEWER AND COLLIMATION PATTERN MASK

(76) Inventor: Minoru Inaba, No. 1116, Oaza Samukawa, Oyama-shi, Tochigi-ken (JP)

( * ) Notice: Subject to any disclaimer, the term of this patent is extended or adjusted under 35 U.S.C. 154(b) by 0 days.

(21) Appl. No.: 09/412,920

(22) Filed: Oct. 5, 1999

(51) Int. Cl.⁷ .................................................. G03B 21/00
(52) U.S. Cl. ............................. 353/7; 353/120; 359/473
(58) Field of Search ................................... 353/7, 9, 120, 353/DIG. 2, DIG. 5; 40/701, 704, 705, 706, 707; 359/466, 467, 469, 473, 477

(56) References Cited

U.S. PATENT DOCUMENTS

| | | |
|---|---|---|
| 2,292,312 | 8/1942 | Wittel et al. . |
| 2,739,401 | 3/1956 | Balter . |
| 2,823,478 | 2/1958 | Ostergaard et al. . |
| 2,842,883 | 7/1958 | Folwell et al. . |
| 3,133,368 | 5/1964 | Perrot . |
| 3,235,991 | 2/1966 | Harper et al. . |
| 3,242,605 | 3/1966 | Kleinschmidt . |
| 3,389,485 | 6/1968 | Roubal . |
| 3,808,722 | 5/1974 | Byers et al. . |
| 3,980,394 | * 9/1976 | Zapf ...................................... 359/473 |
| 4,104,818 | 8/1978 | Hrabik . |
| 4,132,480 | 1/1979 | Reed . |
| 4,314,416 | 2/1982 | Lorsch . |
| 4,431,282 | 2/1984 | Martin geb. Boser . |
| 5,392,548 | 2/1995 | Truc et al. . |
| 5,685,626 | 11/1997 | Inaba . |
| 5,879,064 | * 3/1999 | Inaba ....................................... 353/7 |
| 5,947,575 | * 9/1999 | Inaba ....................................... 353/9 |

* cited by examiner

Primary Examiner—William Dowling
(74) Attorney, Agent, or Firm—Fattibene & Fattibene; Paul A. Fattibene; Arthur T. Fattibene

(57) ABSTRACT

A stereo slide mount capable of adjusting perspective feeling of a stereo image into an optimum state, comprising a base frame 3 having a guide groove formed running in the lateral direction, two film holders 2 fitted in the guide groove, and a cover frame 1. Films are mounted on the two film holders 2 on the base frame 3, and the stereo slide mount is mounted on a stereo slide viewer equipped with a cam mechanism for adjusting the gap between the film holders. The pitch between the films is adjusted to obtain an optimum perspective feeling while observing a stereo image, and the cover frame is mounted after the adjustment.

14 Claims, 7 Drawing Sheets

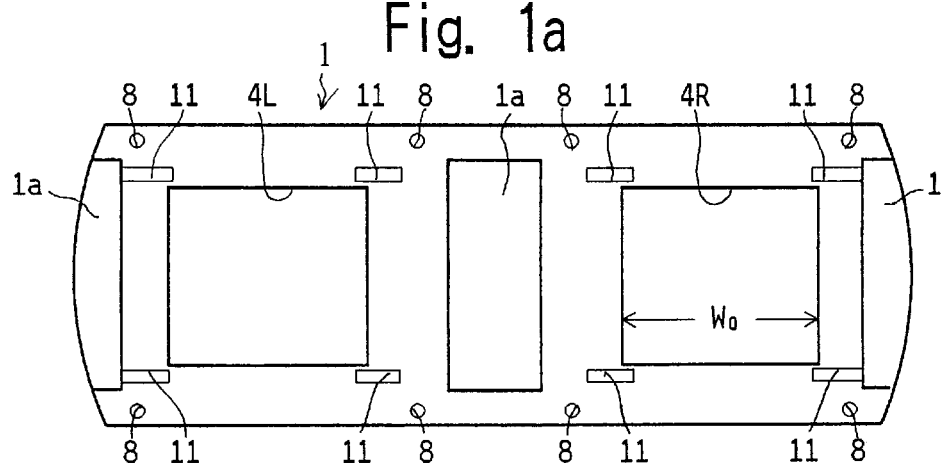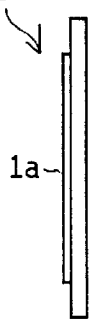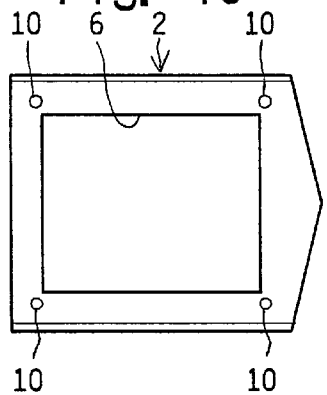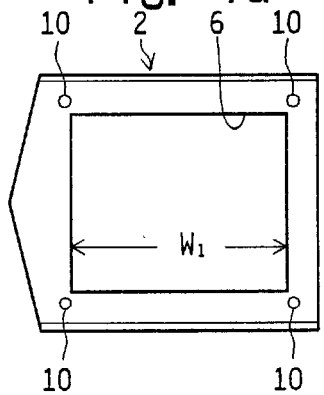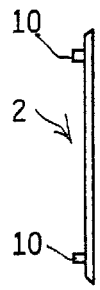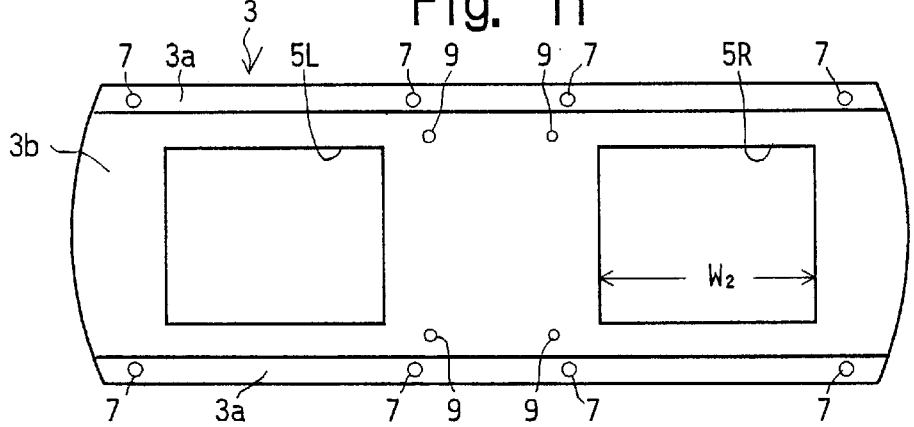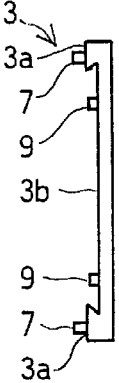

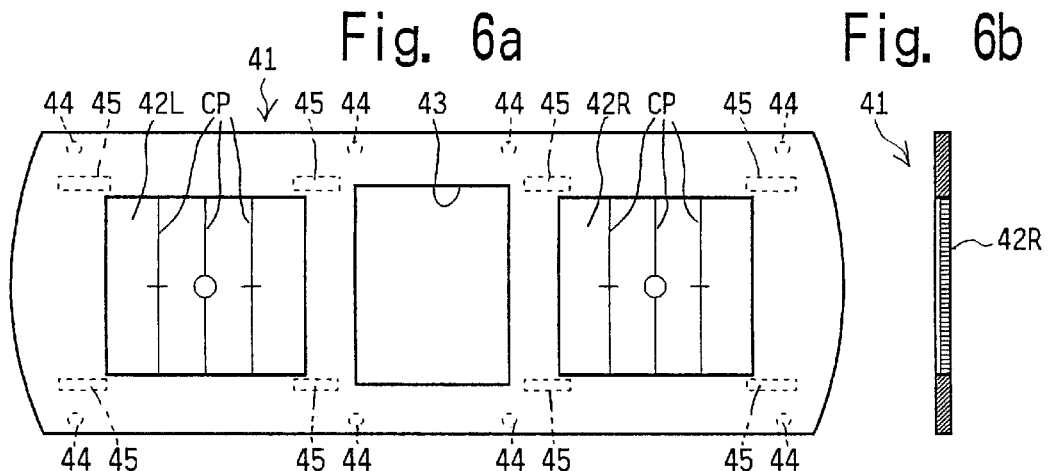
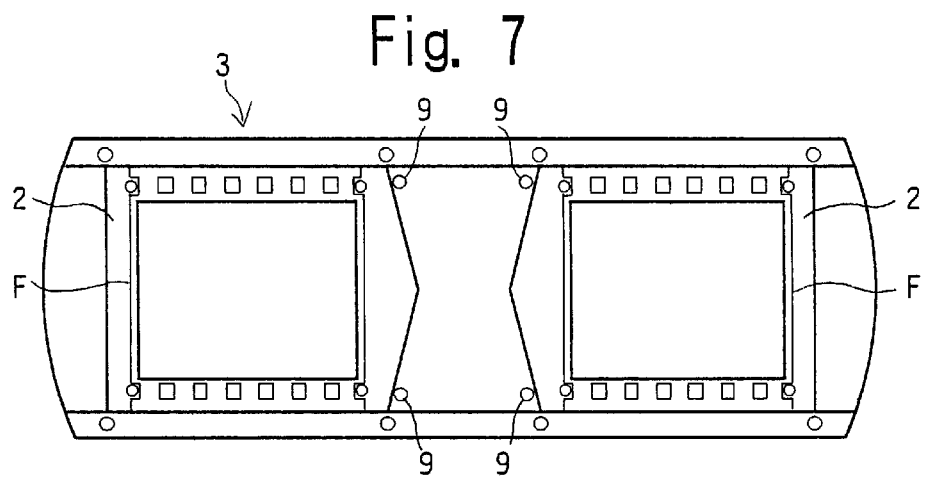
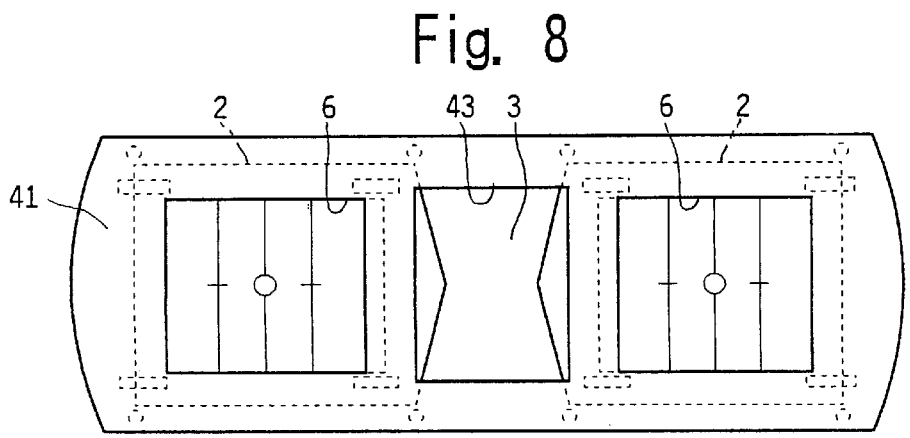

STEREO SLIDE MOUNT, STEREO SLIDE VIEWER AND COLLIMATION PATTERN MASK

BACKGROUND OF THE INVENTION

1. Field of the Invention

The present invention relates to a stereo slide mount capable of adjusting the pitch for mounting the films, to a stereo slide viewer equipped with a function for adjusting the pitch of the stereo slide mount for mounting the films, and to a collimation pattern mask used for the stereo slide viewer.

2. Description of the Prior Art

In almost all stereo cameras, the distance between the optical axes of the right and left photographing lenses has been fixed, and the photographing ranges of the right and left photographing lenses are brought into agreement with each other at an infinite point. In the stereo cameras of the type in which the distance between the optical axes is fixed, the pitch between the same subjects on the right and left photographed pictures varies depending upon the distance to the subject. The pitch between the subjects at an infinite point is equal to the pitch between the right and left pictures, and the pitch between the subjects becomes wider than the pitch between the pictures as the distance to the subject decreases.

The images on the photographed pictures have been turned upside down. Therefore, the right and left films are turned by 180 degrees and are mounted on the stereo slide mount in a state of an erect image. Here, if the films are mounted with the pitch between the pictures of the right and left films being brought into agreement with the pitch between the right and left windows of the stereo slide mount, then, the pitch between the subjects in a close range becomes smaller than the pitch between the right and left windows.

When the stereo slide mount mounting the films in this state is viewed by using a stereo slide viewer, then, a stereo image of the subject in a close range appears in front of the stereo window (aerial image that appears as a single window as the right and left windows of the stereo slide mount are brought into agreement), offering unnatural perspective feeling and causing fatigue to the eyes.

In order that the image of the subject in the closest range appears to be at the same distance as, or slightly farther than, the stereo window, the pitch between the right and left films must be so adjusted that the pitch of the subjects in the closest range becomes larger than the pitch between the right and left windows of the stereo slide mount.

There have also been proposed a stereo camera in which the distance between the optical axes of the right and left photographing lenses is automatically adjusted so that the photographing ranges of the right and left photographing lenses are brought into agreement at a focal distance and a stereo camera which enables the distance between the optical axes of the right and left photographing lenses to be manually adjusted. Even in the stereo cameras of these types, however, the body at a distance closer than the focal distance in many cases appears in front of the stereo window unless the pitch between the right and left films is adjusted at the time of mounting the films.

However, the amount for adjusting the pitch of the films is so small that it is not easy to judge the correct positions for mounting the films by naked eyes.

Thus, there arouses a technical problem that must be solved in order to easily and correctly adjust the pitch of the films mounted on the stereo slide mount. The object of the present invention is to solve the above-mentioned problem.

SUMMARY OF THE INVENTION

In order to accomplish the above-mentioned object, the present invention provides a stereo slide mount comprising a base frame and a cover frame having a right window and a left window, respectively, either one of said base frame or said cover frame being provided with a plurality of pins and the other one being provided with holes corresponding to said pins, so that when said cover frame is overlapped on the surface of said base frame, said pins are fitted to said holes enabling said base frame and said cover frame to be coupled together, wherein:

a guide groove is formed in the surface of said base frame running in the right-and-left direction; and two film holders each having a window of the same size as the size of the pictures of the films and capable of mounting a frame of film, are engaged with said guide groove of said base frame, so that the gap between said two film holders can be adjusted in the right-and-left direction.

The invention further provides a stereo slide viewer comprising right and left eyepieces, and a slide mount holder unit for mounting a stereo slide mount, wherein a film pitch-adjusting device is provided at an intermediate position between the right and left eyepieces but outside the visual fields of the right and left eyepieces in order to push the inner ends of the two film holders of said stereo slide mount so as to be slid outward, thereby to adjust the gap between the two film holders.

The invention further provides a collimation pattern mask having the same shape as the cover frame of said stereo slide mount, wherein the right and left transparent windows made of a resin or a glass are provided with the same collimation pattern, a central window is formed in an intermediate portion between the right and left transparent windows, and the inner ends of the two film holders are exposed in said central window when the collimation pattern mask is overlapped on the base frame mounting the two film holders.

BRIEF DESCRIPTION OF THE DRAWINGS

FIG. 1 illustrates constituent parts of a stereo slide mount, wherein FIG. 1a is a back view of a cover frame, FIG. 1b is a side. view of the cover frame, FIGS. 1c and 1d are front views of film holders, FIG. 1e is a side view of the film holder, FIG. 1f is a front view of a base frame, and FIG. 1g is a side view of the base frame;

FIG. 6a is a front view of a collimation pattern mask, and FIG. 6b is a sectional side view thereof;

FIG. 7 is a front view illustrating a state where the film holders and the films are mounted on the base frame;

FIG. 8 is a front view of when the collimation pattern mask is mounted on the base frame of the state of FIG. 7.

DESCRIPTION OF THE PREFERRED EMBODIMENTS

Figure 2:
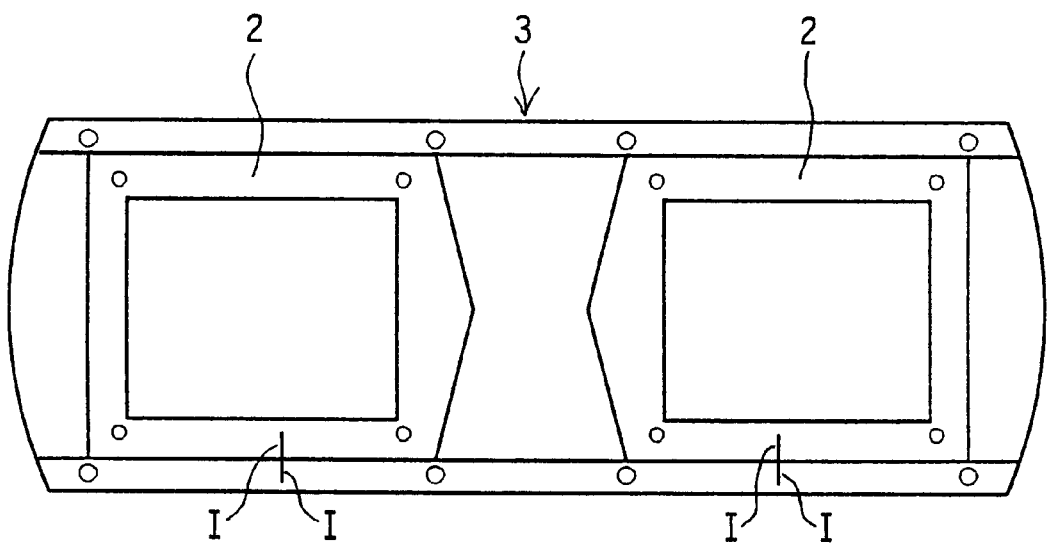
FIG. 2 is a front view illustrating the base frame and the film holders according to another embodiment.

An embodiment of the invention will now be described in detail with reference to the drawings. FIG. 1 illustrates a cover frame 1 that constitutes a stereo slide mount, two pieces of film holders 2, and a base frame 3, that are all obtained by injection-molding a resin, and wherein FIG. 1a shows the back surface of the cover frame 1 that comes in contact with the base frame 3.

Like the conventional stereo slide mount, the base frame 3 and the cover frame 1 have right and left windows 4L, 4R, 5L and 5R. The two pieces of film holders 2 sandwiched by the base frame 3 and the cover frame 1, have a window 6, too.

The vertical sizes of all of these windows 4L, 4R, 5L and 5R are equal to the vertical size of the picture of the stereo slide film, the lateral width W0 of the windows 4L and 4R of the cover frame 1 is slightly smaller than the width of the picture of the film, the lateral width W1 of the window 6 of the film holders 2 is equal to the width of the picture of the film, and the lateral width W2 of the windows 5L and 5R of the base frame 3 is equal to, or larger than, the lateral width W0 of the windows 4L and 4R of the cover frame 1. It is desired that the pitch between the centers of the right and left windows 4R and 4L of the cover frame 1 is about 63 mm which is nearly equal to the distance between two human eyes.

An intermediate portion of the base frame 3 in the up-and-down direction shown in FIGS. 1f and 1g forms a recessed portion 3b lower than the upper and lower edge portions 3a; i.e., the recessed portion 3b forms a groove having a vertical width larger than the distance between the upper and lower edge portions 3a. A plurality of pins 7 are formed in the upper and lower edge portions 3a. Pin holes 8 are formed in the upper and lower edge portions of the cover frame 1 so as to be fitted to the pins of the base frame 3. When the cover frame 1 is placed on the base frame 3 so that the pins 7 are fitted to the holes 8, the base frame 3 and the cover frame 1 can be coupled together.

The base frame 3 having a dovetail groove formed therein is fitted to the film holders 2 having a trapezoidal shape in cross section as shown in FIG. 1e, and permits the film holders 2 mounted on the base frame 3 to be slid in the right-and-left direction.

Stopper pins 9 are provided on the inner sides of the right and left windows of the base frame 3. When the two pieces of film holders 2 are slid to approach each other until they come into contact with the stopper pins 9, the pitch between the windows of the two pieces of film holders 2 is positioned to be a maximum in the range of adjusting the film pitch in the negative direction. At this moment, the pitch between the windows of the film holders 2 is slightly smaller than the pitch between the windows of the cover frame 1.

As shown in FIG. 2, further, positioning indexes I may be provided for the film holders 2 and for the base frame 3 instead of the stopper pins.

Referring to FIGS. 1c and 1d, the two pieces of film holders 2 have a pentagonal shape with their one vertical side being protruded in a V-shape, and are mounted on the base frame 3 with their V-shaped vertical sides being opposed to each other. Right and left film-positioning pins 10 are provided on the upper and lower sides of the window 6 of the film holders 2. When the films are set with their perforations being engaged with the film-positioning pins 10, the pictures of the films are brought into agreement with the windows 6 of the film holders 2.

As for positioning the films in the up-and-down direction, the thickness of the film holder 2 is selected to be slightly smaller than the depth of the recessed portion 3b of the base frame, and the films are positioned in the up-and-down direction relying on the upper and lower edges 3a of the base frame 3.

Or the vertical width of the film holder is selected to be wider than the one that is diagramed, a shallow horizontal groove is formed at the center of the film holder in the up-and-down direction, the shallow horizontal groove having a width equal to the vertical width of the film, and the positions of the films are determined in the up-and-down direction relying on the horizontal groove, or positioning bosses are formed on the film holder to come in contact with the upper and lower sides of the films. Thus, the films can be positioned in the up-and-down direction according to various means without any particular limitation.

The vertexes of the V-shaped vertical sides of the film holders 2 come into contact with helical cams of the stereo slide viewer that will be described later. It is, therefore, desired that the vertexes are slightly rounded to decrease the frictional resistance.

Laterally elongated recessed portions 11 are formed in the back surface of the cover frame 1 to avoid interference with the film-positioning pins 10 of the film holders 2. The film holders 2 on the base frame 3 can be freely slid in the right-and-left direction over a predetermined range in a state where the cover frame 1 is mounted on the base frame 3. As shown, furthermore, protruded portions 1a may be formed at the central portion and at both the right and left end portions to come in contact with the recessed portion 3b of the base frame 3.

It is further desired to form a very small protuberance on the back surfaces of the film holders 2 so that the film holders 2 mounted on the base frame 3 will not slide due to vibration, and to effect matting onto the recessed portion 3b of the base frame 3 so as to form an anti-slipping means.

Figure 3:
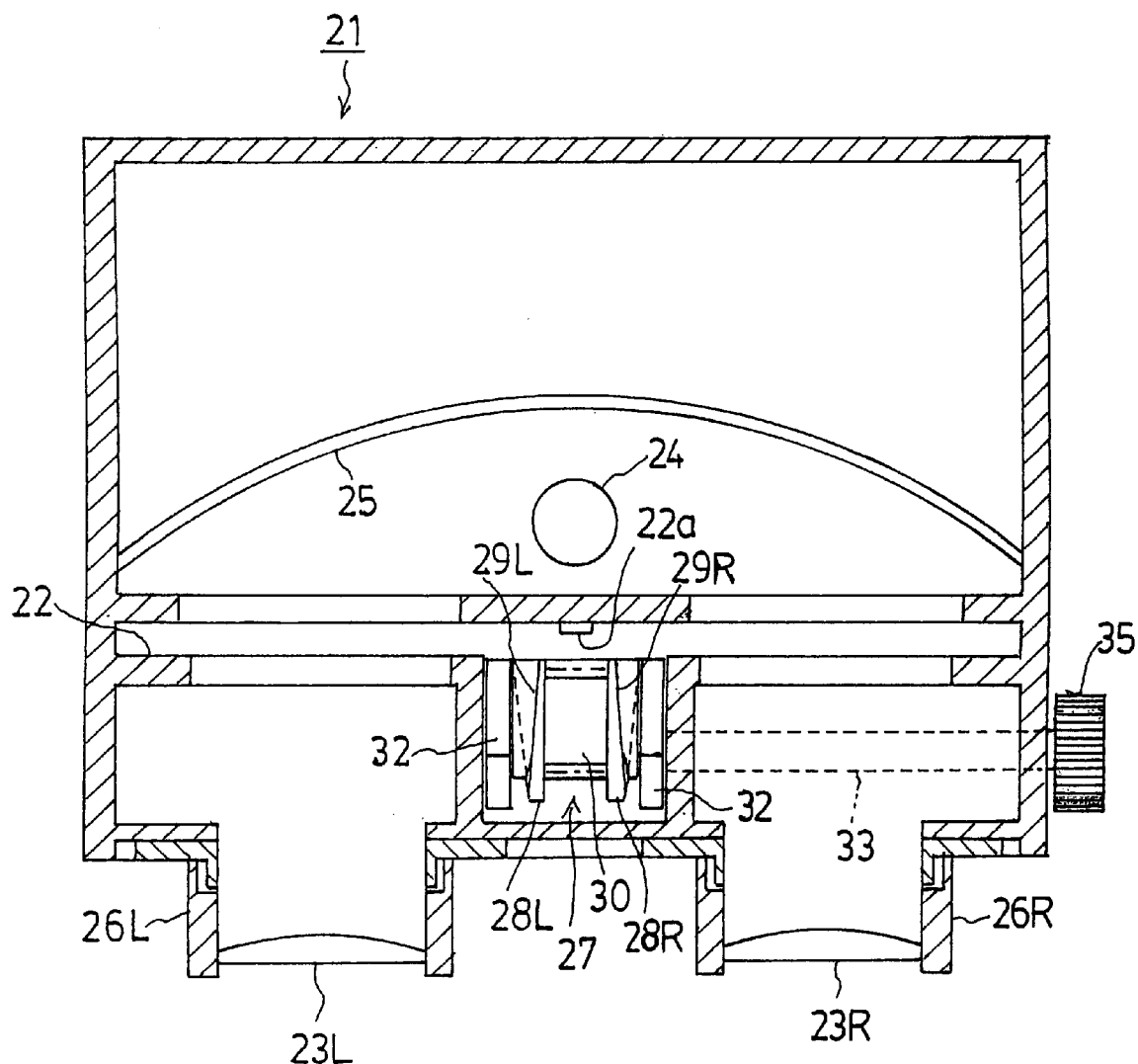
FIG. 3 is a sectional plan view of a stereo slide viewer of the present invention.

FIG. 3 illustrates a stereo slide viewer 21 in which a pair of right and left eyepieces 23R and 23L are arranged in front of a groove-shaped slide mount holder unit 22 like in the conventional stereo slide viewer, and an illumination bulb 24 and an arcuate reflector 25 are arranged at the back of the slide mount holder unit 22. The bulb 24 is turned on by a cell (not shown) accommodated at the back of the reflector 25, and light is projected onto the back surface of the slide mount holder unit 22 by the reflector 25. The right and left eyepiece holders 26R and 26L are so constructed as to adjust the distance between the optical axes thereof and to adjust the focal point in the direction of the optical axes. A leaf spring 22a is provided on the rear wall surface in the slide mount holder unit 22 to bring the stereo slide mount in the slide mount holder unit 22 into pressed contact with the wall surface on the side of the eyepieces.

A film pitch-adjusting device 27 is disposed between the right and left eyepiece optical systems. The film pitch-adjusting device 27 turns the helical cams 28R and 28L to adjust the gap between the film holders 2 of the stereo slide mount.

Figure 4:
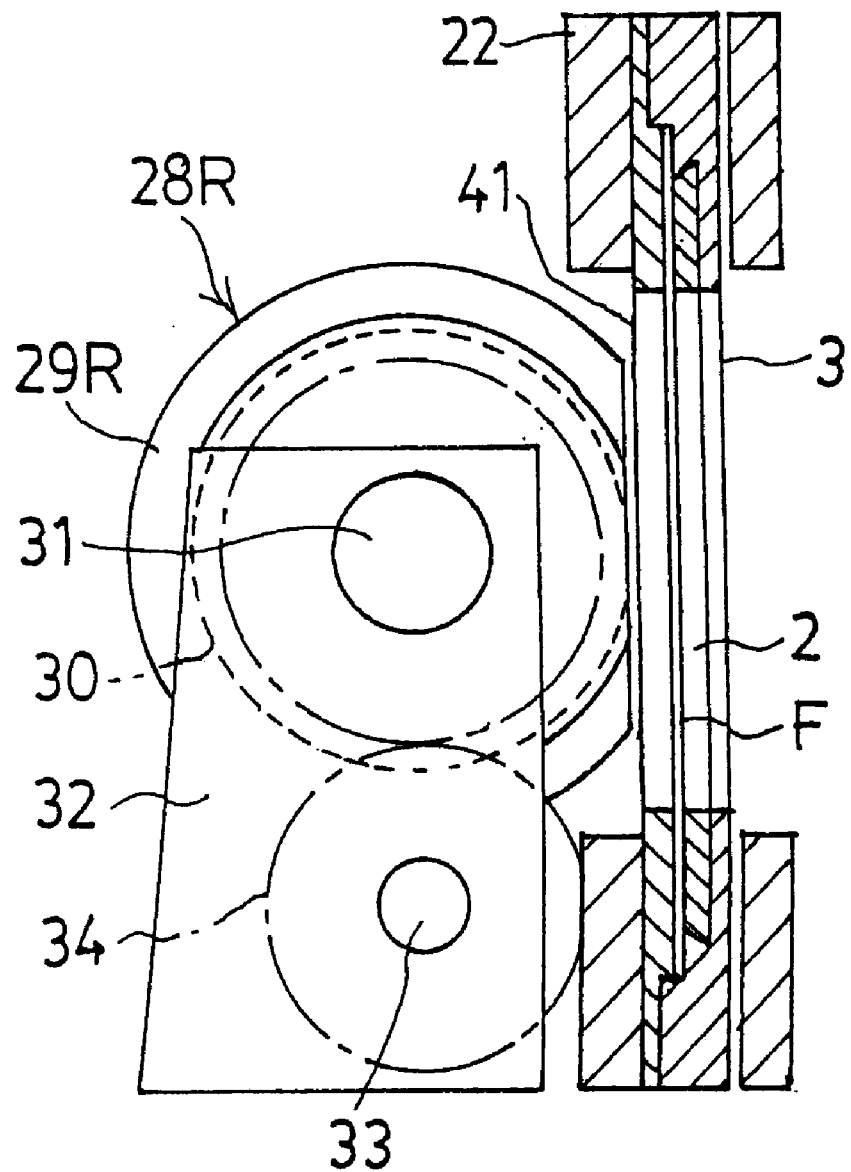
FIG. 4 is a side view of a film pitch-adjusting device in the stereo slide viewer.

Referring to FIG. 4, the pair of right and left helical cams 28R and 28L have a D-shape in cross section formed by linearly cutting a portion of the outer peripheral surface of the disk. Referring to FIG. 3, helicoidal cam surfaces 29R and 29L are formed at the outer edges on the outer side surfaces, the right cam surface 29R and the left cam surface 29L being symmetrical to each other.

The two pieces of helical cams 28R and 28L are fitted to a cam shaft 31 with a spur gear 30 sandwiched therebetween. The right and left ends of the cam shaft 31 are supported by bracket bearings 32 provided on the viewer frame. Under the cam shaft 31 is arranged a pinion shaft 33 in parallel with the cam shaft 31, and a pinion 34 fitted to the pinion shaft 33 is in mesh with the spur gear 30. A turn of a knob 35 attached to an end of the pinion shaft 33 causes the helical cams 28R and 28L to turn.

Figure 5:
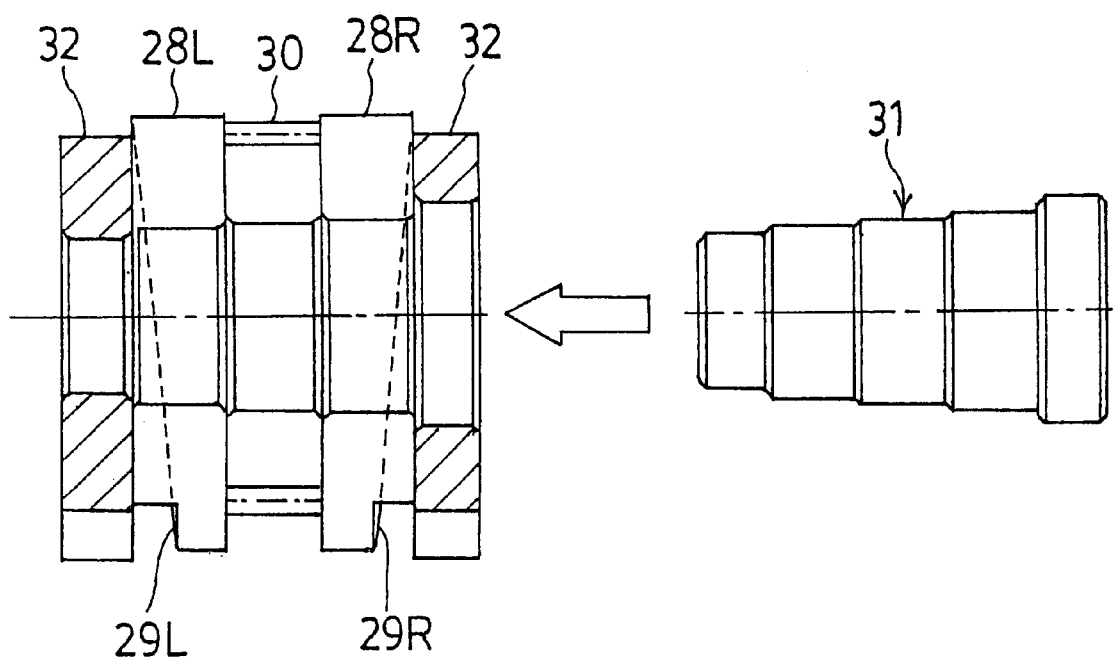
FIG. 5 is a sectional plan view illustrating a step of assembling the film pitch-adjusting device.

Referring to FIG. 5, the right and left bracket bearings 32, two pieces of helical cams 28R and 28L, and the central spur gear 30 have center holes of which the inner diameters gradually increase from the left toward the right in order of left bracket bearing 32, left helical cam 28L, spur gear 30, right helical cam 28R and right bracket bearing 32. The cam shaft 31, too, has stepped diameters to meet thereto.

To assemble the film pitch-adjusting device 27, two pieces of helical cams 28R and 28L and the central spur gear 30 are set, between the right and left bracket bearings 32, and the cam shaft 31 is introduced toward the left from the outer side of the right bracket bearing 32 in a state where the phases of the two pieces of helical cams 28R and 28L are in correct agreement. The two pieces of helical cams 28R, 28L, central spur gear 30 and cam shaft 31 are tightly fitted, whereas the cam shaft 31 and the right and left bracket bearings 32 are loosely fitted, so that the two pieces of helical cams 28L, 28R and the central spur gear 30 are integrally fitted together. The gear for driving the helical cams may be a worm gear a bevel gear instead of the spur gear 30 that is shown, and there is no particular limitation.

FIG. 6 illustrates a collimation pattern mask 41 which makes it possible to easily recognize an optimum pitch in adjusting the pitch of films of the stereo slide mount by the stereo slide viewer 21. The collimation pattern mask 41 has a shape similar to the cover frame 1 and is coated with a light-shielding coating material that interrupts the transmission of light except the right and left transparent windows 42R and 42L, or is formed of a colored resin and has a square window 43 formed at the central portion thereof.

The sizes and positions of the transparent windows 42L, 42R, holes 44 and recessed portions 45 are the same as those of the cover frame 1, and the same collimation patterns CP comprising chiefly a plurality of vertical lines are printed on the back surfaces of the transparent windows 42R and 42L (surface coming in contact with the films), the surfaces being subjected to the anti-Newton ring treatment.

Referring to FIG. 6b, the surfaces of the transparent windows 42R and 42L are slightly lower than the peripheries thereof so will not to come in contact with the wall surfaces of the slide mount holder unit 22 of the stereo slide viewer; i.e., the transparent windows 42R and 42L are prevented from getting scarred. In order to prevent the film surfaces from scratched at the time of adjusting the film pitch, furthermore, it is desired that the back surface of the collimation pattern mask 41 is coated with a substance having a small coefficient of friction, such as Teflon or polyethylene to smoothly finish the surface.

The stereo slide mount and the collimation pattern mask 41 have right and left ends of an arcuate shape so as to be easily inserted in the slide mount holder portion 22. The insertion can be accomplished even when the lateral width of the slide mount holder unit 22 is selected to be equal to the lateral width of the base frame 3, whereby the stereo slide mount is prevented from being deviated in position in the right-and-left direction in the slide mount holder unit 22.

Next, described below is the procedure of the operation for mounting the films and for adjusting the pitch of the films.
1. Referring to FIG. 7, two pieces of right and left film holders 2 are attached to the base frame 3, and the films F are attached to the film holders 2 while bringing the right and left film holders 2 to positions where they stay closest to each other.
2. The collimation pattern mask 41 is attached to the base frame 3. Referring to FIG. 8, the inner ends of the film holders 2 appear being exposed in the central window 43 of the collimation pattern mask 41.
3. The base frame 3 on which the collimation pattern mask 41 is mounted is inserted in the slide mount holder unit 22 of the stereo slide viewer 21.
4. Perspective feeling of the image for the image of collimation pattern CP of the collimation pattern mask 41 is observed through the eyepieces 23R and 23L of the stereo slide viewer 21. If the image appears on the same plane as the collimation pattern CP or at the back of the collimation pattern CP, the pitch between the films of the stereo slide mount is proper, and the pitch between the films needs not be adjusted. Therefore, the stereo slide mount is removed from the stereo slide viewer 21, the collimation pattern mask 41 is removed from the base frame 3 and, instead, the cover frame 1 is mounted to complete the mounting operation.

In most of the cases, however, the subject in a close-range view appears in front of the collimation pattern CP, making it necessary to adjust the pitch of the films.
5. The knob 35 of the stereo slide viewer 21 is turned to adjust the pitch between the films. In FIG. 4, when the pinion 34 is turned in the counterclockwise direction, the helical cams 28R and 28L turn in the clockwise direction from the initial positions in FIG. 4, the ends of the cam surfaces 29R and 29L enter into between the two pieces of film holders 2; i.e., the cam surfaces 29R and 29L come in contact with the vertexes of the inner vertical sides of the film holders 2 to push them outward, and the gap increases between the two pieces of film holders 2.

Here, the outer edges of the pictures of the films are masked over increased areas by the edges of the window of the collimation pattern mask 41, and the distance to the stereo image moves farther away with respect to the image of the collimation pattern CP. An optimum film pitch is accomplished when the stereo image appears on the same plane as the collimation pattern CP or at the back of the collimation pattern CP. At this moment, the knob 35 is turned reverse to return the helical cams 28R and 28L back to the initial positions. Then, the stereo slide mount is removed from the stereo slide viewer 21, the collimation pattern mask 41 is removed from the base frame 3 and, instead, the cover frame 1 is mounted thereon to complete the stereo slide mount having an optimum pitch between the films.

The completed stereo slide mount can be viewed by using the stereo slide viewer 21. Even if the knob 35 is turned while viewing, the film holders 2 are shielded by the cover frame 1 and, hence, the helical cams 28R and 28L do not come in contact with the film holders 2, and the pitch of the films does not change. If the pinion shaft 33 or the cam shaft 31 is provided with a click-stop mechanism in order to secure the helical cams 28R and 28L at the initial positions, the helical cams 28R and 28L are not turned undesirably.

When the pitch of the films that is being adjusted exceeds the optimum pitch causing the stereo image to appear very farther than the collimation pattern CP, the pitch of the films must be adjusted again. In this case, the knob 35 is reversely turned to return the helical cams 28R and 28L back to the initial positions, the right and left film holders 2 are slid to the positions at where they become closest to each other, and the knob 35 is turned again to adjust the pitch of the films again. Though not diagramed, a protrusion or a recess may be formed on the surface near the vertex of the V-shaped vertical sides of the film holders 2, so that the film holders can be easily slid to the closest positions by a finger nail.

In the conventional stereo slide mount, when the offset amount of the films exceeds a limit value, the side edges of the films appear in the windows of the mount, and light leaks through space between the side edges of the films and the edges of the windows. Therefore, it is not allowed to adjust the offset in excess of the limit value.

In the stereo slide mount of the present invention, on the other hand, the films are mounted on the film holders 2 of the shape of a window frame. When the offset amount of the film holders 2 exceeds a limit value, therefore, the vertical sides of the film holders 2 appear in the windows 4L and 4R of the cover frame 1 without forming space between the side edges of the films and the edges of the windows 4L and 4R. It is therefore allowed to effect the offset adjustment in excess of the limit value. In this case, however, black edges of the films and part of the film holders 2 appear in the windows 4L and 4R of the cover frame 1 causing an effense to the eye when the film holders 2 are of a while color or of a bright color. However, the offense to the eye can be removed if the surfaces of the film holders 2 are black.

Figure 9:
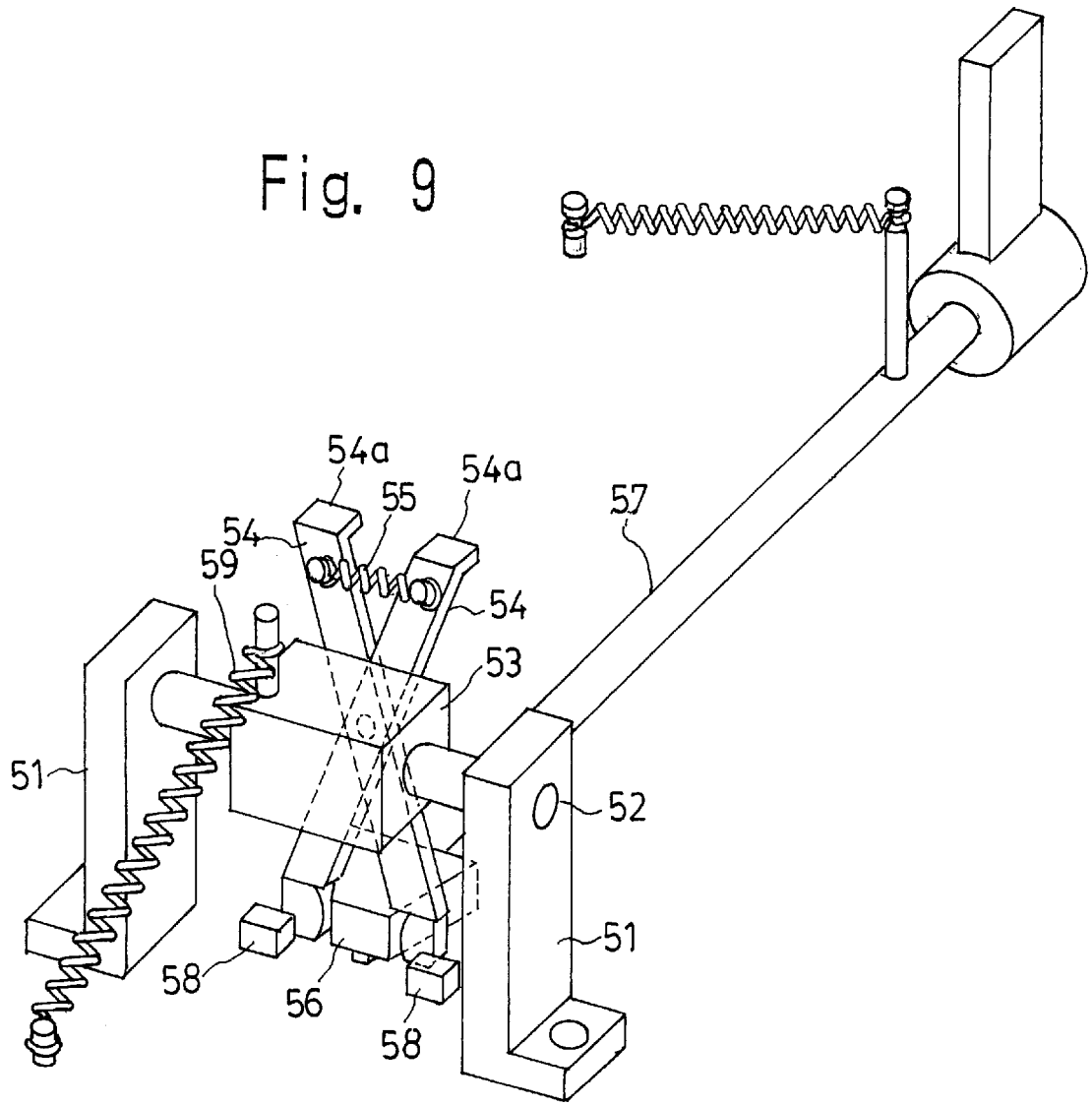
FIG. 9 is a perspective view illustrating the film pitch-adjusting device according to another embodiment.

FIG. 9 illustrates the film pitch-adjusting mechanism for the stereo slide viewer according to another embodiment. Like in the film pitch-adjusting mechanism of FIG. 3, the right and left bracket bearings 51 are arranged in space between the right and left eyepieces (not shown), a block 53 is mounted on the center of a pivot shaft 52 supported by the right and left bracket bearings 51, and two levers 54 are pivotally attached to a lever shaft on the back surface of the block 53.

The upper ends of the two levers 54 are folded rearward to form nail portions 54a. The two levers 54 arranged in an X-shape are urged by a pulling spring 55 toward the directions in which their upper ends are closed.

A wedge-like slider 56 is disposed between the lower ends of the two levers 54 to slide back and forth, and an externally threaded shaft 57 is engaged with an internally threaded portion (not shown) formed in the back surface of the wedge-like slider 56. Stoppers 58 are provided in front of the lower ends of the two levers 54. The block 53 is allowed to turn over a range between a position at where the lower ends of the two levers 54 shown come in contact with the stoppers 58 and a position at where the lower ends of the levers 54 are retreated to some extent. The lower ends of the levers 54 are urged by a pulling spring 59 toward the direction to retreat.

Here, when the externally threaded shaft 57 is turned clockwise in FIG. 9, the wedge-like slider 56 advances toward the stoppers 58 due to the feed screw action of the internal thread and the external thread, whereby the lower ends of the two levers 54 are pushed to come into contact with the stoppers 58. At this moment, the upper ends of the two levers 54 turn rearward and, though not diagrammed, the pawl portions 54a of the levers 54 enter into between the right and left film holders 2 that are sandwiched by the base frame 3 and the collimation pattern mask 41.

When the externally threaded shaft 57 is further turned clockwise, the two levers 54 in contact with the stoppers 58 are expanded at their lower ends by the wedge-like slider 56 that is advancing, whereby the pawls 54a at the upper ends that are expanding being linked thereto push the right and left film holders 2 to expand the pitch thereof, making it possible to adjust the pitch of the films like with the above-mentioned stereo slide viewer 21.

As described above, the stereo slide mount of the present invention makes it possible to freely adjust the pitch between the right and left films and, hence, to adjust the perspective feeling of the stereo image into an optimum state. By using the stereo slide viewer and the collimation pattern mask of the present invention, further, the pitch between the films on the stereo slide mount can be easily and correctly adjusted while observing the stereo image of the right and left films.

Here, it should be noted that the present invention is in no way limited to the above-mentioned embodiments only but can be modified in a variety of ways without departing from the technical scope of the invention and, hence, the invention encompasses the modified examples as a matter of course.

I claim:

1. A stereo slide mount comprising a base frame and a cover frame having a right window and a left window, respectively, either one of said base frame or said cover frame being provided with a plurality of pins and the other one being provided with holes corresponding to said pins, so that when said cover frame is overlapped on the surface of said base frame, said pins are fitted to said holes enabling said base frame and said cover frame to be coupled together, wherein:

a guide groove is formed in the surface of said base frame running in the right-and-left direction; and two film holders each having a window of the same size as the size of the pictures of the films and capable of mounting a frame of film, are engaged with said guide groove of said base frame, so that the gap between said two film holders can be adjusted in the right-and-left direction.

2. A stereo slide mount according to claim 1, wherein the windows of said cover frame have a width narrower than the width of the pictures of the films.

3. A stereo slide mount according to claim 1, wherein the upper and lower portions of the windows of said film holders are provided with positioning pins with which the perforations of the films can be engaged, so that the pictures of the films engaged with the positioning pins are brought into agreement with the windows of the film holders.

4. A stereo slide mount according to claim 1, wherein the upper and lower portions of the windows of said film holders are provided with positioning pins with which the perforations of the films can be engaged, so that the pictures of the films engaged with the positioning pins are brought into agreement with the windows of the film holders, and recessed portions are formed in the base frame and in the back surface of the cover frame mounted on the film holders, in order to avoid interference with the positioning pins of the film holders.

5. A stereo slide mount according to claim 1, wherein stoppers for positioning the film holders are provided between the right and left windows of said base frame so that, when the two film holders are brought into contact with the stoppers, the pitch between the windows of the right and left two film holders is set to be smaller than a pitch between the right and left windows of the cover frame.

6. A stereo slide mount according to claim 1, wherein said base frame and said film holders are provided with indexes for positioning, and when the indexes of said base frame are brought into agreement with the indexes of said film holders, the pitch between the windows of the right and left two film holders is set to be smaller than the pitch between the right and left windows of the cover frame.

7. A stereo slide mount according to claim 1, wherein the opposing inner vertical sides of the two film holders are formed in an arcuate shape or in a V-shape, so that the intermediate portions of the vertical sides protrude inward.

8. A stereo slide mount according to claim 1, wherein the right and left ends of said base frame and said cover frame are formed in an arcuate shape or in a shape close to an arc.

9. A stereo slide mount according to claim 1, wherein said two film holders have black surfaces.

10. A stereo slide viewer comprising right and left eyepieces, and a slide mount holder unit for mounting a stereo slide mount, wherein a film pitch-adjusting device is provided at an intermediate position between the right and left eyepieces but outside the visual fields of the right and left eyepieces in order to push the inner ends of two film holders of said stereo slide mount so as to be slid outward, thereby to adjust the gap between the two film holders.

11. A stereo slide viewer according to claim 9, wherein said film pitch-adjusting device for said stereo slide viewer comprises right and left symmetrical helical cams supported by a horizontal shaft in parallel with the slide mount holder unit, and said helical cams are turned being inserted between the two film holders on a base frame in order to expand the gap between the two film holders.

12. A stereo slide viewer according to claim 9, wherein said film pitch-adjusting device for said stereo slide viewer comprises right and left two levers that open and close symmetrically, and the ends of the two levers are inserted between the two film holders on a base frame and are expanded in order to expand the gap between the two film holders.

13. A collimation pattern mask having the same shape as a cover frame of a stereo slide mount, wherein the right and left transparent windows made of a resin or a glass are provided with the same collimation pattern, a central window is formed in an intermediate portion between the right and left transparent windows, and the inner ends of two film holders are exposed in said central window when the collimation pattern mask is overlapped on a base frame mounting the two film holders.

14. A collimation pattern mask according to claim 12, wherein the right and left ends of said collimation pattern mask are formed in an arcuate shape or in a shape close to an arc.

* * * * *

UNITED STATES PATENT AND TRADEMARK OFFICE
CERTIFICATE OF CORRECTION

PATENT NO. : 6,296,360 B1
DATED : October 2, 2001
INVENTOR(S) : Minoru Inaba

Page 1 of 1

It is certified that error appears in the above-identified patent and that said Letters Patent is hereby corrected as shown below:

Column 9,
Line 11, "claim 9" should read -- claim 10 --;
Line 18, "claim 9" should read -- claim 10 -- ; and Column 10,
Line 15, "claim 12" should read -- claim 13 --.

Signed and Sealed this

Thirtieth Day of April, 2002

Attest:

JAMES E. ROGAN
Attesting Officer — Director of the United States Patent and Trademark Office